5826X
No Printed Specification Available.
*W. H. Howard.*
*Loom.*
*Patented Feb. 12, 1830.*
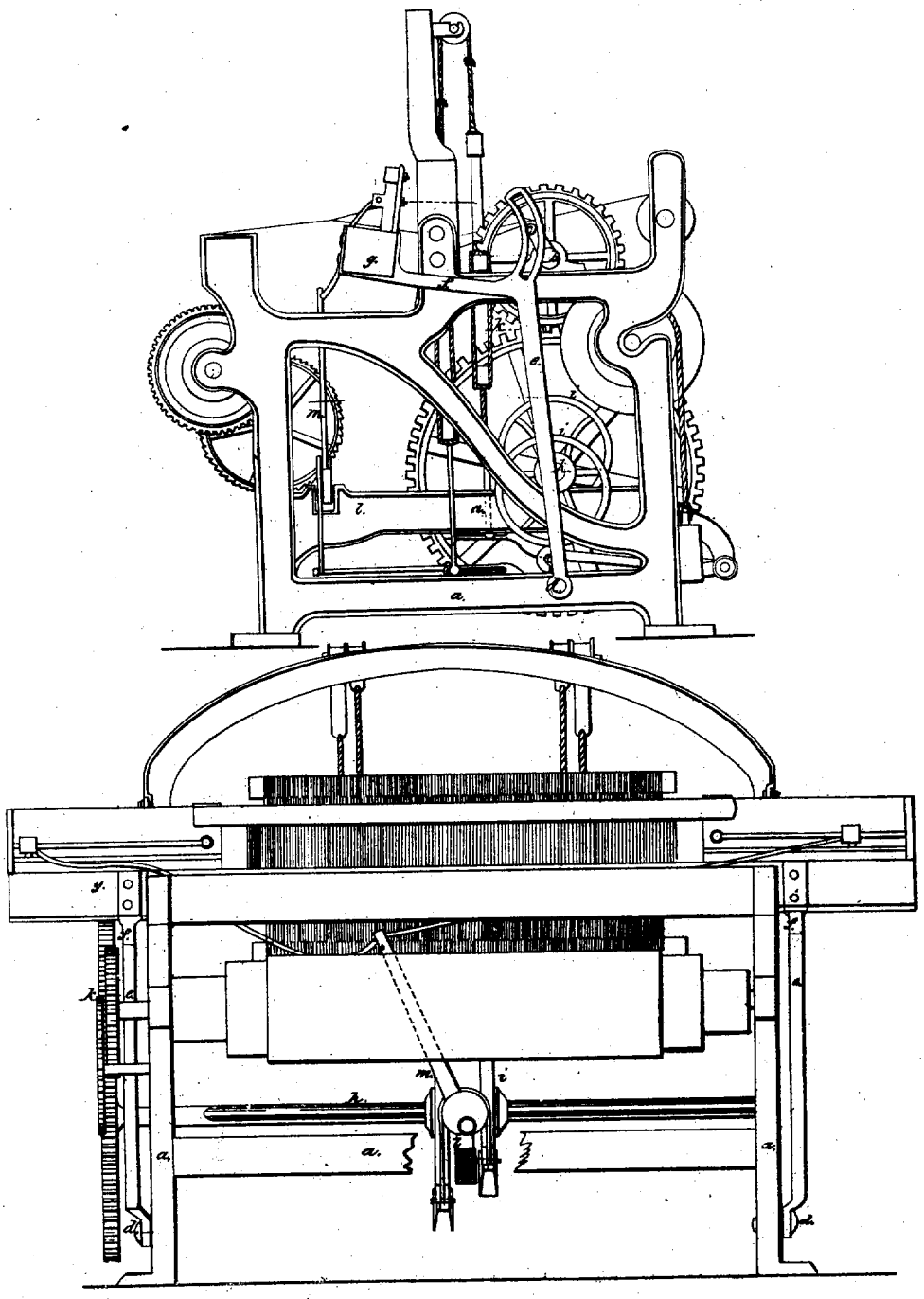

William H. Howard.

Letters Patent

The schedule referred to in these Letters Patent and making part of the same containing a description in the words of the said William H. Howard himself of his improvement in the Power Loom called the improved vibrating cam Loom"

---

To all persons to whom these presents shall come. William H. Howard of Worcester in the County of Worcester & State of Massachusetts machinist sends greeting. Be it known that I the said Howard have invented made & applied to use a new & useful improvement in the power loom called the "Improved vibrating cam Loom" & specified in the words following. Power looms such as have been and are now in general use are constructed with a frame of sufficient length to receive the desired width of cloth & of width enough to admit the lathe to vibrate and the harness to open the warp for the passage of the shuttle. It has a shaft called the main shaft extending the length of the loom & is placed nearly in the centre of the frame. On each end of said main shaft are cranks or sweeps The lathe is supported on pivots at the bottom and near one corner of the frame. The perpendicular parts of the lathe at the ends on which it rests & vibrates are called "Lathe Standards". The lathe is put in motion by means of an arm extending from the crank on the main shaft to the back side of the lathe. The shuttle & harness are put in motion by means of cams on a shaft lying under the main shaft & connected with the said main shaft [illegible] by gears. The cams are in the centre of the loom & supported by a [illegible] girt. The looms as above described are called "crank looms" & are found to answer a valuable purpose for weaving narrow cloth, but for weaving broad cloth they are not considered suitable on account of the motion of the lathe as produced by the crank not giving sufficient time for the shuttle to pass before the lathe advances to beat in the weft. To obviate this difficulty various methods have been introduced. The most effectual one I will endeavour to describe in the words following. A piece of

[illegible]

[illegible]

X 5826

[illegible] about two feet in length is placed perpendicularly at one end of
the main shaft the bottom of which is supported on a pivot made fast to
the end of the loom frame directly under the main shaft. On the top of this
pin is a mortise of a circular form & the pin in the crank enters this mortise
and as it revolves produces a vibrating motion to the upright piece above
described which is called the "vibrating cam" the motion is given to the
lathe by arms extending from the "vibrating cam" to the lathe in the same
manner as in the crank loom. The two looms already described resem-
ble each other in every other respect than that of giving a desired motion to
the lathe by means of the vibrating cams. I do not however claim any im-
provement in the looms already specified as my improvement but I do
claim the particular method of applying the vibrating cams more directly
simply & effectually than ever before done & also that of the cross girt. In
pointing out my improvement reference is to be had to the drawing de-
posited in the Patent Office. My improvement consists 1st in making
the circular mortices called "vibrating cams" as above) in the Lathe stand
and instead of having a separate piece for that purpose alone 2nd that of
applying the cross girt so as to admit of the cams straddling said cross girt
& that part called the "sway staff" being hung on a pivot on the cross girt.
In testimony that the above is a true specification of my improvement as
above described. I have hereto set my hand & seal this twenty fifth day of
November in the year of our Lord one thousand eight hundred and thir-
ty nine Witnesses Joel Dewing Emory Washburn William H. Howard

742